Figure 1:
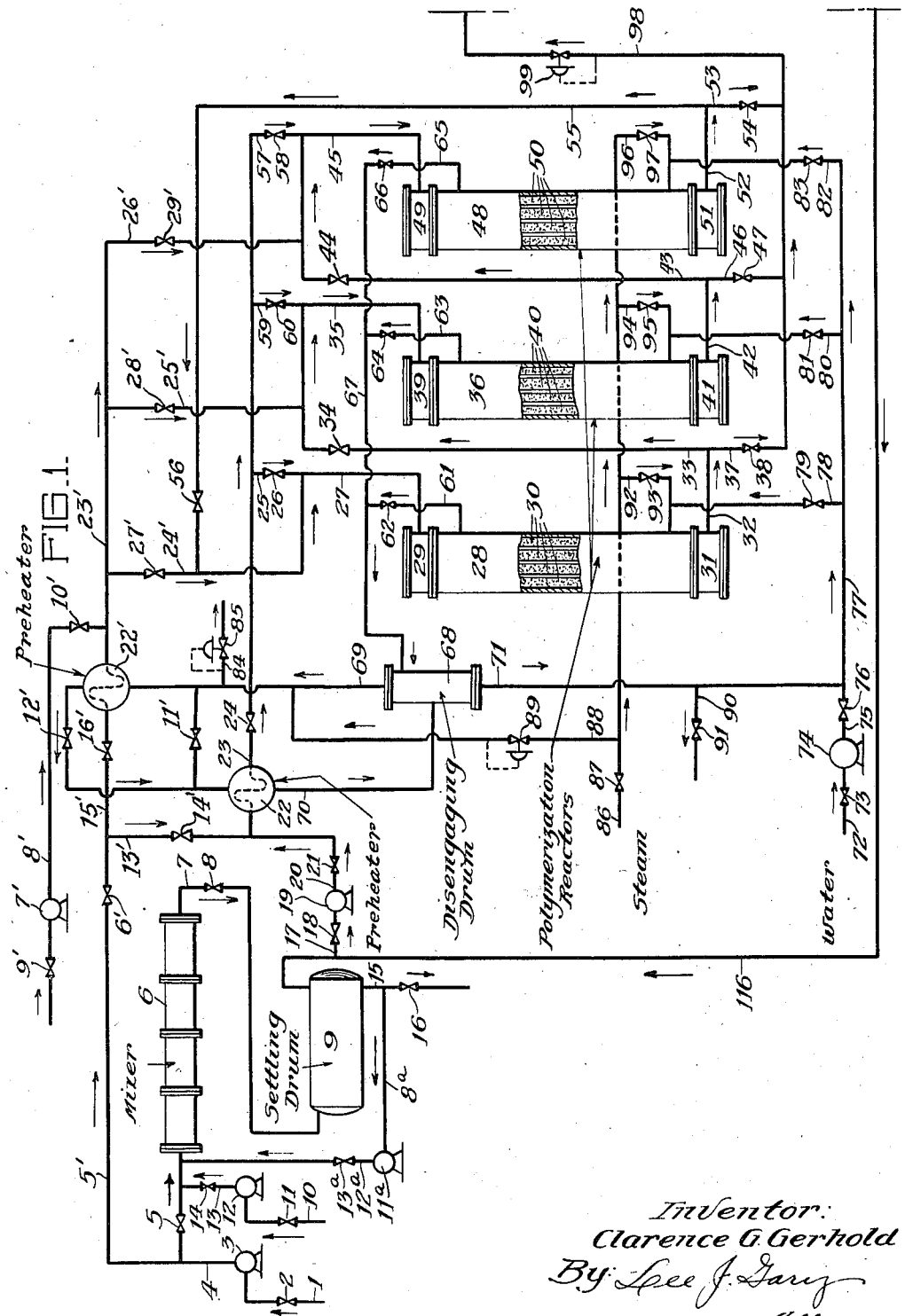

July 28, 1942. C. G. GERHOLD 2,291,216
POLYMERIZATION OF OLEFINS
Filed Dec. 12, 1938 2 Sheets-Sheet 1

Inventor:
Clarence G. Gerhold
By Lee J. Gary
Attorney

July 28, 1942.  C. G. GERHOLD  2,291,216
POLYMERIZATION OF OLEFINS
Filed Dec. 12, 1938  2 Sheets-Sheet 2

FIG. 2.

Inventor:
Clarence G. Gerhold
By Fred J. Gary
Attorney

Patented July 28, 1942

2,291,216

UNITED STATES PATENT OFFICE 2,291,216

POLYMERIZATION OF OLEFINS

Clarence G. Gerhold, Chicago, Ill., assignor to Universal Oil Products Company, Chicago, Ill., a corporation of Delaware Application December 12, 1938, Serial No. 245,196

3 Claims. (Cl. 260—683)

This invention relates particularly to the manufacture of iso-octanes or hydrocarbon mixtures containing relatively high percentages of iso-octanes from normally gaseous olefin hydrocarbons.

Primarily, it is concerned with a process involving a succession of closely co-operating steps whereby maximum yields of iso-octanes having a relatively high octane value are produced from relatively close cut hydrocarbon fractions comprising butanes and butenes commonly known to the oil industry as "B-B" fractions. These fractions are producible from the hydrocarbon mixtures evolved as overhead vapors in the stabilization of primary cracked distillates. The process is also applicable to mixtures of 4-carbon atom hydrocarbons containing varying percentages of olefins produced in any other manner such as, for example, the dehydration of butyl alcohols or the partial or complete dehydrogenation or cracking of butanes. More specifically it is concerned with a process for regulating and controlling the extent of the reaction during the polymerization step of the process for the production of iso-octane in order to produce a maximum yield of iso-octane having high octane value.

The iso-paraffins and particularly the iso-octanes are at present a very desirable fuel for aviation engines on account of their high antiknock value, medium boiling range, and stability in respect to gummy and resinous deposits which may cause trouble in fuel feed systems. They are also sought after as blending fluids for increasing the antiknock value of motor fuels which are below grade in this respect. The present process permits the maximum utilization of the 4-carbon atoms in the aforesaid B-B fractions for the production of iso-octane mixtures in which the major constituents seem to be 2,2,4-trimethyl pentane, and 2,2,3-trimethyl pentane, both iso-octanes of high antiknock value, although the exact determination of the relative proportions of the different isomers is difficult.

The present process for the production of iso-octane involves two stages: First, a polymerization stage for the polymerization of the olefins in the so-called "B-B" fraction to iso-octenes, followed by a second stage of hydrogenation of the iso-octenes to iso-octanes. The first stage, which involves a large amount of mixed polymerization of n- and iso-butenes, is commonly called "selective" polymerization.

In one specific embodiment the present invention comprises processing butane-butene mixtures for the production of iso-octane by the following series of steps:

(1) Optional preliminary treatment to remove impurities deleterious to the catalyst employed in succeeding polymerizing and hydrogenating stages. This usually involves washing of the liquid fraction with basic aqueous solution or with water or with both in a two-stage washing treatment.

(2) Subjecting the charge under controlled conditions of polymerizing temperatures and pressures to contact with catalysts of increasing activity disposed in reactors which provide for removal of reaction heat to effect a controlled degree of mixed polymerization of the normal and iso-butenes.

(3) Fractionating the efflux from the polymerizing step to separate the polymers from the residual butanes and unreacted butenes.

(4) Returning residual butanes (including unreacted butenes) to the charge if required to reduce the butene content of the mixture passing over the catalyst.

(5) Further fractionating the debutanized polymers to produce an overhead iso-octene fraction and a bottom product of heavy polymers.

(6) Hydrogenating the mixture of iso-octenes to produce iso-octanes by subjecting the iso-octenes together with hydrogen under vapor phase superatmospheric temperature and pressure conditions to contact with nickel-containing catalyst disposed in reactors which provide for the removal of reaction heat.

In the operation of the so-called selective polymerization stage of the process which comprises subjecting butenes to contact with polymerizing catalyst under polymerizing conditions and temperatures and pressures for the production of a polymer product containing principally iso-octenes which are then hydrogenated to produce high octane number iso-octanes, I have found that the preferred type of operation is one in which the catalyst first coming in contact with the B-B fraction is weak and in which the strength of the catalyst gradually increases, and is very active near the end of the polymerizing reaction. The use of this method of operation results in the production of a maximum octane number of iso-octane while at the same time effecting a high degree of polymerization of the butenes to octenes. I have found that if the polymerization rate at the inlet of the polymerizing zone is high, particularly when the concentration of the more active butylenes is high, an excessively high local temperature at the surface of the catalyst is developed which is considerably higher than the temperature of the flowing stream, resulting in the production of octenes having a poor octane number after hydrogenation. Such local temperature development can be avoided through the use of weaker catalyst during the initial stage of the polymerization. A weak catalyst is satisfactory in the first portion of the polymerizing zone since the high concentration of active butylenes makes it possible to obtain rapid polymerization in spite of the low catalyst activity.

As the polymerization through the catalyst bed proceeds, the concentration of the more active butylenes decreases and it then becomes necessary to contact the olefins with a catalyst having a higher activity in order to produce the desired conversion of butenes to octenes. Summarizing the above, it is advantageous to use a catalyst mass having a graded activity, being very weak at the inlet end of the reactor zone and very active at the outlet end. One manner of accomplishing this result is to manufacture catalyst having varied degrees of activity and place the less active catalyst in contact with the fresh olefins undergoing polymerization and gradually using catalyst of higher activity as the olefin concentration decreases. This gives satisfactory results although it is not practical to manufacture and to use catalyst of varying activity and to avoid the use of prepared catalyst of varying activity I may use a catalyst of the same activity and decreasing the activity of the initial catalyst mass by passing a poisoning agent through the initial portion of the catalyst mass. This is accomplished by pretreating the catalyst mass for a definite period of time either with ammonia, amines or other basic nitrogen compounds. The catalyst bed is preferably poisoned to such an extent that it controls the initial polymerization of olefins when the concentration of the active olefins is high in such a manner that the octane number of the final hydrogenated product is not impaired. When this point is reached it is not only no longer necessary to further poison the catalyst, but it is also harmful because any further poisoning results in a less active catalyst which in turn results in a decrease in the conversion of the butenes to octenes.

The polymerization of the butenes to octenes usually occurs in several reactors in series. It has been found that after the polymerization reaction has been carried out for a sufficient length of time that the first reactor containing the catalyst mass is no longer sufficiently active for the polymerization of the olefins and it is necessary to regenerate the first catalyst bed. Therefore, in order to accomplish the objects of my invention it is necessary to rotate the reactors in a definite manner in order to contact the butenes undergoing polymerization with the least active catalyst while the concentration of the butenes is high, and by reactors containing catalysts of increasing activity as the concentration of the butenes decreases. This may be illustrated as follows:

Assume that there are four catalyst reactors: a, b, c, and d, and that catalyst reactors a, b, and c are being used in the polymerization stage of the process, catalyst reactor d being a standby reactor containing either fresh catalyst or regenerated catalyst. As soon as the catalyst in reactor a becomes poisoned or the activity of the catalyst in reactor a decreases to such a point that it no longer effects any substantial polymerization of the butenes to octenes, reactor a is cut out of the system and the reactor d containing active catalyst placed in the system after the reactor c. Thereby, the catalyst reactor b becomes the least active and is followed by the reactors c and d containing more active catalyst masses. Catalyst in reactor a is now regenerated and as soon as catalyst in reactor b loses its activity to such a point that it is no longer useful, reactor b is removed from the system and reactor a after either regeneration of the catalyst contained therein or refilling with fresh catalyst is placed in the system after reactor c. This method of rotation is maintained in such a manner that the spent catalyst always contacts the catalyst initially and the fresh catalyst or regenerated catalyst is always placed in the final stage of the polymerizing system.

Previously it has been found advantageous to subject the butane-butene mixture prior to polymerization to a preliminary treatment to remove impurities deleterious to the catalyst employed in the succeeding polymerizing and hydrogenating stages. This usually involves washing of the liquid fractions with basic aqueous solution and in general aqueous solutions having an alkaline reaction and controlled concentration. Although this preliminary treatment is often advantageous and at times necessary, it is frequently unnecessary and in some instances harmful. I have found that by passing the butane-butene mixture without any preliminary treatment to the catalyst reactors that the impurities contained in the butane-butene mixture may be used to poison the catalyst to such an extent that it prevents the excessive temperature rise and over polymerization herein discussed. The poisons tend to be removed in the first portion of the catalyst mass, which weakens the catalyst and enables the process to produce a uniformly high octane number in the final iso-octane product. As soon as the catalyst in the first reactor is sufficiently poisoned that further poisoning will no longer be beneficial for the production of high octane iso-octenes at the end of the hydrogenation step, the butane-butene mixture is then subjected to preliminary treatment for the removal of those substances deleterious to the catalyst since further poisoning tends to decrease the yields obtainable from the catalytic polymerization of butenes to octenes.

The above methods illustrate several ways of carrying out the objects of my invention, but I do not wish to limit my invention to any particular method for contacting the fresh butane-butene mixture to catalytic polymerization with a catalyst of progressively increasing activity.

The foregoing brief outline of the character and steps of the process will be amplified by describing a typical operation in connection with the attached drawings comprising Figures 1 and 2, which show diagrammatically, by the use of conventional figures generally in side elevation, an arrangement in which the object of the process may be accomplished. The units and connections shown in the drawings are not to any exact or relative scale and are not intended to limit the scope of the invention.

Referring to the drawings, butane-butene fractions are admitted under sufficient pressure to maintain them in liquid phase at ordinary temperatures to a charging pump 3 by way of a line 1 containing a valve 2 and are discharged through a line 4 containing a valve 5 through a mixer 6 which may comprise a succession of perforated plates or any other type of internal structure which will insure turbulence. Wash liquids which usually comprise water or moderately concentrated solutions of caustic soda of from approximately 5 to 15° Bé. in gravity are admitted through line 10 containing valve 11 to a pump 12 which discharges through line 13 containing valve 14 into line 4 preceding the mixer. The impurities commonly encountered in butane-butene fractions from cracking processes operating upon different types of petroleum oils and their fractions are usually removed by this treatment to a sufficient degree to adequately protect the life of the catalyst. If water washing or the use of weak acids are necessary to take the place of or supplement the treatment with caustic soda, these steps may be employed without departing from the scope of the invention, although only a single washing step is all that is shown on the drawings.

Prior to removing reactor 28 from the system after the catalyst in this reactor loses its activity to such a point that it is no longer effective in polymerizing olefins, it is usually necessary to pretreat the reactor 36 either with ammonia or with untreated B—B charge in order to reduce the activity of the catalyst in reactor 36 to such a point that it no longer harms the octane number of the final iso-octanes produced. For a catalyst comprising solid phosphoric acid it has been found that basic ammonia compounds are those poisons which reduce the activity of the catalyst. If any other catalyst is used, any other suitable poison may be introduced into reactor 36 prior to the time that reactor 28 is removed from the system and reactor 36 becomes the catalyst reactor which first contacts the B—B charge. It has been found that in charging in ordinary B—B fraction containing about .0006 percentage of basic ammonia compounds that from 24 to 48 hours' pre-treatment of reactor 36 prior to the time it becomes the first reactor in series is required in order to maintain the octane number of the final iso-octane recovered at a maximum level.

In order to provide for the pretreatment of the catalyst in any particular reactor, line 5' containing valve 6' is provided in order that a portion or all of the B—B fraction may bypass the pretreating step of the system by passing the B—B fraction through line 5' containing valve 6' into line 13' containing valve 14'. If it is desired to pretreat a portion of the B—B fraction and at the same time not to treat a second portion of the B—B fraction, line 15' containing valve 16' is provided for passing the untreated B—B fraction through preheater 22' into line 23'. The untreated portion of the B—B fraction may be introduced into any of the three reactors shown, viz., 28, 36, and 48, by means of lines 24', 25', and 26', respectively, containing valves 27', 28', and 29', respectively. In case it is desired to pretreat or treat any of the reactors with ammonia I have provided pump 7' in line 8' containing valves 9' and 10' connected to the manifold line 23'.

I have found that one to two grams of ammonia per pound of catalyst is required to sufficiently reduce the activity of the catalyst in reactor 36 to such a point that it no longer has a harmful effect on the octane number of the final iso-octane product. In case only fresh catalyst is available, I have found it necessary to pretreat the fresh catalyst with slightly higher amounts of ammonia, that is, from two to three grams of ammonia per pound of catalyst in order to reduce the activity of the catalyst first contacting the fresh B—B fraction in order to reduce the activity of the catalyst to such a point that a high octane number for the final iso-octane product can be maintained.

The mixture of hydrocarbons and washing fluids passes through line 7 containing valve 8 to a settling drum 9 which has a drawoff line 15 containing a valve 16 for the removal of spent or partially spent washing fluids. If found advantageous, the amount of washing fluid which is passed through the mixer in admixture with the hydrocarbons may be increased without increasing the amount of fluid used by the process by recirculating the washing fluid which settles in drum 9 to the inlet line 4 of mixer 6 through line 8a, pump 11a, and line 12a containing valve 13a.

The purified hydrocarbon charge passes through line 17 and valve 18 to a pump 19 which discharges through line 20 containing a valve 21 through a preheater 22 wherein the temperature is raised to the optimum point for initiating the polymerization of the olefins. Steam passes to the preheater 22 and condenses in indirect contact with the charge in the preheater under a pressure corresponding to the optimum temperature of treatment. The source of the steam at this point will be described later in connection with the system of temperature control.

The preheated charge is now passed under suitable pressure to a polymerizing treatment in reactors containing polymerizing catalyst. Among preferred catalyst are precalcined mixtures of phosphoric acids and adsorbents, the latter preferably being of a siliceous character and comprising such materials as certain clays of the Montmorillonite and bentonite type (either raw or acid treated), kieselguhr, precipitated silica, and other siliceous and refractory materials. Granular catalyst may be prepared by making a paste, for example, of kieselguhr, and a major proportion by weight of ortho or pyrophosphoric acid, calcining the mixture at temperatures from approximately 300–400° C. to produce a cake, grinding and sizing the cake to produce particles of a convenient size, usually from about 4–20 mesh and if necessary subjecting the sized particles to the action of superheated steam at about 265° C. (510° F.) and atmospheric pressure to bring the active catalytic acid to a state of hydration corresponding to maximum efficiency. The above procedure may be modified by extruding and forming the original pasty material and calcining the preformed particles.

The optimum utilization of both the normal and the iso-butenes in the butane-butene mixtures to produce high antiknock iso-octane requires the maximum cross polymerization of iso- and normal butenes with the minimum separate polymerization of normal or iso-butenes. It has been found that temperatures and pressures must be defined within relatively close limits in order that the iso-octanes produced by the polymerization may be hydrogenated to high antiknock iso-octanes. The temperatures at which the reaction is preferably initiated fall within the approximate range of 200–420° F. and the pressures are of the order of 500–750 pounds per square inch or higher. At higher temperatures and lower pressures the polymerization will produce apparently satisfactory iso-octenes, but when these are hydrogenated the iso-octanes will be of lower antiknock value.

The reactions of polymerization of olefins are exothermic and in order to secure best results means must be provided for abstracting evolved heat to prevent excessive temperature rise in the catalyst zone. Two systems of temperature control may be employed in the process. Thus, (a) the polymerizing catalyst may be contained in banks of tubes of relatively small diameter which are surrounded by a cooling medium (such as evaporating water) in suitably constructed reactors, and (b) a part of the butanes (possibly containing small percentages of butenes) which are separated from the polymer product after polymerization has taken place, may be returned to the butane-butene charge, thereby reducing the relative amount of reacting hydrocarbons and increasing the relative amount of non-reacting hydrocarbons in the material passing over the polymerizing catalyst.

The effect of cooling as described under (a) above generally controls the average temperature at which the catalyst operates, while the effect of (b) a part of the butanes (possibly containing small percentages of butenes) which are separated from the polymer product after polymerization has taken place, may be returned to the butane-butene charge, thereby reducing the relative amount of reacting hydrocarbons and increasing the relative amount of non-reacting hydrocarbons in the material passing over the polymerizing catalyst.

The effect of cooling as described under (a) above generally controls the average temperature at which the catalyst operates, while the effect of (b) above is to locally avoid the temperature rise of the catalytic surfaces of the catalyst particles by providing relatively large quantities of inert material (butanes) as heat absorbing material at the point where the reaction takes place. The step (b) may be necessary only in cases where the available charging stock is relatively high in butene content.

A number of reactors may be employed in series so connected that individual reactors may be segregated when the catalyst has become spent, in order to replace such spent catalyst while employing other reactors, in which the catalyst has sufficient activity, to continue operation. Three such reactors are indicated in the drawings although more may be used.

From preheater 22 the charge flows through line 23 containing valve 24 and may follow line 25 containing valve 26 and line 27 to enter the upper section 29 of reactor 28 and pass downwardly through the tubes 30 containing the polymerizing catalyst into lower space 31 from which the polymerized olefins in admixture with butanes and butenes leave through line 32, and pass either into line 33 containing valve 34 which permits passage of the partially treated materials through line 35 to reactor 36, or line 37 containing valve 38 leading directly to the succeeding fractionating and hydrogenating steps through line 38 containing pressure control valve 39 which may be automatic.

Reactor 36 may be of the same construction as reactor 28, containing the same open distributing space 39 at the top, catalyst tubes 40 and lower collecting space 41 from which the reacted hydrocarbons and mixtures of butanes and butenes leave through line 42 and pass either through line 43 containing valve 44 to line 45 to reactor 48 or through line 46 containing valve 47 to the succeeding fractionating and hydrogenating steps through line 98 containing valve 99.

Line 45 permits the passage of the charge to reactor 48 which is of the same construction as reactors 28 and 36 with respect to upper free space 49, catalyst tubes 50, and lower open space 51 from which polymerized products and mixtures of butanes and butenes pass through line 52 and line 53 containing valve 54 to the succeeding fractionating and hydrogenating steps through line 98 and valve 99. In order that the reactors may be used in different order, line 55 containing valve 56 permits passing the material to line 27 leading into reactor 28, which will be the case when reactor 48 is the first of the series and reactor 28 is the second. In this case valve 26 in line 25 will be closed, and valve 58 in line 57 will be open. Reactor 36 is also directly connected to charge line 23 by line 59 containing valve 60. The connections shown enable the use of the polymerization reactors in any order in a general direction from left to right as shown in the drawings, and this same general system of operation may be applied to any number of reactors although only three are shown.

The system of controlling temperature in the reactors may consist of surrounding the tubes with boiling water, the evaporation being maintained by the heat of reaction. The steam generated in the reactors passes through lines 61, 63 and 65, containing valves 62, 63 and 66 respectively through line 67 into disengaging drum 68. In this drum any water carried by the steam is separated from the steam. The steam passes from the drum 68 through line 69 to the preheater 22 or 22', or both as desired, by valves 11' and 12'. The heat required for preheating the charge is extracted from the steam resulting in its condensation. The water so formed returns by gravity through line 70 to drum 68. The water flows from drum 68 through line 71 into line 77. Water required for the original filling of the reactors, or make-up water enters the system through line 72 containing valve 73 and leading to pump 74 which discharges into line 77. The water may flow from line 77 into reactors 28, 36, and 48 through lines 78, 80, and 82 containing valves 79, 81, and 83 respectively.

The reactor-cooling and charge-preheating system may operate under two alternative conditions. When the quantity of steam generated in reactors 28, 36, and 48 is more than the steam condensed in preheating the charge in preheater 22, the excess steam is discharged through line 84 containing upstream pressure control valve 85. The amount of water leaving the system in the form of steam through line 84 is replaced by charging an equal amount to the system by means of pump 74.

When the quantity of steam generated in reactors 28, 36 and 48 is less than the steam condensed in preheating the charge in preheater 22, the difference is supplied by adding steam to the system from an outside source through line 86 containing valve 87 and line 88 containing down-stream pressure control valve 89. A quantity of water equivalent to the steam entering the system through line 88 and valve 89 is continuously or intermittently withdrawn through line 90 containing valve 91.

The temperature at which the reactors 28, 36, and 48 operate depends on the boiling temperature of the water surrounding the catalyst tubes, and this boiling temperature is adjusted to the desired point at the pressure maintained on the cooling system by means of either valve 85 or valve 89.

In order to start the operation of the process the water in reactors 28, 36, and 48 must be heated to approximately boiling temperature. Heating this water to this temperature may be accomplished by steam injection by means of steam header 86 and branch lines 92, 94 and 96 containing valves 93, 95 and 97 respectively.

It is to be understood that the method of removing reaction heat herein described constitutes the preferred method, but may be replaced by other suitable methods, such as the circulation of relatively large quantities of warm liquid cooling medium. The essential features of the cooling system are that it provides on the one hand for effective removal of reaction heat from the catalyst-containing zone, while on the other hand it prevents any substantial sub-cooling of the reaction zone when the catalyst has become partially spent, or generally in any section of the reaction zone wherein the reaction proceeds at a reduced rate.

According to the present process the polymer products comprising principally iso-octanes which may be converted into high antiknock iso-octanes when operations have been properly conducted, are first freed of residual butanes and then fractionated to produce mixtures of octenes. For this purpose the products are first passed to a debutanizer 100 through line 98 containing up-stream pressure control valve 99. Ordinarily the debutanizer will be operated at a pressure of about 100 pounds per square inch with a top vapor temperature of about 65° C. (150° F.) and a bottom temperature of 196° C. (385° F.) maintained by any type of reboiling coil shown as 100', which may permit the passage of steam or process fluids as may be convenient. The vapors of butanes pass through line 101 containing up-stream pressure control valve 102 and are liquefied during passage through condenser 103 and flow through line 104 into receiver 105 which has a conventional gas release line 106 containing valve 107. Part of the butanes are withdrawn from the receiver through line 108 and are passed through line 109 containing valve 110 to pump 111 which discharges through line 112 containing valve 113 to the top of the debutanizer in sufficient amount to control the character of the overhead product therefrom. Excess butanes are discharged from the process through line 114 containing valve 115. When desired a certain portion of the butane production may be circulated back to the entrance of the polymerization reactors by means of line 116 containing valve 117 in order to maintain the concentration of the butenes in the mixture of butanes and butenes passing over the polymerizing catalyst at a fixed point to control the temperature rise of the catalytic surfaces by controlling the amount of exothermic heat generated relative to the total quantity of material flowing over the catalyst.

The debutanized polymers now pass through line 118 containing valve 119 to fractionator 120. If desired a portion of the product at this point may be diverted to storage through line 121 containing valve 122, cooler 123, and line 124 containing valve 125.

Fractionator 120 is normally operated at a slight superatmospheric pressure of the order of 10 pounds per square inch with a top temperature of 135° C. (275° F.) and a bottom temperature of 200° C. (390° F.) maintained by reboiling coil 120' as shown. This fractionator preferably functions to remove hydrocarbon materials boiling above octenes (or above the final boiling point required in whatever finished product may be contemplated), the high boiling fractions leaving the bottom of the column through line 126 containing valve 127 and thence passing through cooler 128 and line 129 containing valve 130.

The overhead vapors from fractionator 120 comprising principally octenes pass through line 131 containing valve 132 and through a condenser 133 which has rundown line 134 leading to receiver 135 equipped with the conventional gas release line 136 containing valve 137. The octene fraction accumulating in this receiver passes through a line 136' to pump 137' which returns a sufficient amount of the overhead product through line 138 containing valve 139 to the top of the column to control the character of the overhead product. The octene material produced passes through line 140 to pump 141 and is charged through line 142 containing valve 143 to the final step of the process involving hydrogenation of the octenes to octanes. Any part of the octene product may also be sent to storage through line 144 containing valve 145.

The general features of the final hydrogenating unit are counterflow of hydrogen and octenes in two stages, with recycling of hydrogen in the second stage if required, so that the largest proportional amount of hydrogen is admixed with the octenes in their final stage of hydrogenation. Thus the octene fraction is pumped under a pressure of approximately 30 to 120 pounds per square inch through a preheater 146 which employs indirect steam contact, while hydrogen from the final product receiver is added to the octene fraction through line 180. The preheater is preferably operated so that the mixture of hydrogen and octene is heated to a temperature of approximately 150–215° C. (302–419° F.) before entering upper distributing space 148 of primary hydrogenation reactor 147, the mixture passing downwardly through tubes 149 containing hydrogenating catalyst to lower collecting space 150. The partially hydrogenated octenes plus hydrogen (and other fixed gases in case hydrogen-containing gases instead of pure hydrogen are used) pass through line 151 and valve 152 through condenser 153 and line 154 to intermediate receiver 155. Fixed gases are vented from the system through line 156 containing upstream pressure control valve 157.

The partially hydrogenated product then passes to the second stage of hydrogenation through line 158, pump 159, and line 160 containing valve 161. To complete the hydrogenation of the octenes, they are mixed with the incoming full supply of hydrogen or hydrogen-containing gas which is admitted through line 162 containing valve 163 and is charged by compressor 164 through line 165 which joins line 160. The mixture of hydrogen and the partially hydrogenated product then flows through line 166 containing valve 167 to pass through preheater 168 in which the temperature is brought again to 150–215° C. The mixture of hydrogen and hydrocarbon vapors passes from upper free space 170 in reactor 169 downwardly through the catalyst in tubes 171 and into lower collecting space 172 from whence the final hydrogenated product consisting of iso-octanes and unused hydrogen pass through line 173 containing valve 174 through condenser 175 and line 176 to final receiver 177 from which the main product of the process is withdrawn through a line 178 containing valve 179.

The gases which are separated from the final product in receiver 177 flow through line 180 containing upstream pressure control valve 181, and are added to the octene fraction entering preheater 146 as before described.

In order to increase the hydrogen concentration in the final stage to obtain a fully saturated final iso-octane product, gases from receiver 177 may be recycled through preheater 168 and reactor 169 by means of line 182 containing valve 183, compressor 184, and line 185 which joins line 166.

Any type of hydrogenating catalyst may be employed though the more active varieties are preferred such as, for example, reduced nickel on a siliceous carrier. A convenient method of producing an active catalyst for this process consists in precipitating nickel carbonate on kieselguhr, pressing into pills, and then drying and reducing directly with hydrogen at a temperature of 400° C. (750° F.). Less active catalysts may be employed such as, for example, the oxides of chromium, molybdenum, and tungsten, but in such cases the pressures and temperatures and time of contact will need to be increased to obtain effective saturation.

The hydrogenation reaction is exothermic and in general the same system of temperature control may be utilized as was described in connection with the polymerizing reactors. The preferred system consists in surrounding the tubes of reactors 147 and 169 with boiling water, the evaporation being maintained by the heat of reaction. The steam generated in the reactors passes through lines 186 and 188 containing valves 187 and 189 respectively into disengaging drum 190. In this drum any water carried by the steam is separated from the steam. The steam flows from the disengaging drum through line 191 and continues onward to preheater 146 through line 192 and to preheater 168 through line 193. The heat required for preheating is extracted from the steam resulting in its condensation. The water formed in the preheaters returns to the disengaging drum through lines 194 and 195. Water in the disengaging drum 190 flows through line 196 to reactor 147 containing valve 198, and to reactor 169 through line 199 containing valve 200. Water required for the original filling of the reactors, or make-up water, enters the system through line 201 containing valve 202. This line may also be used for discharging water from the system.

The reactor-cooling and charge-preheating system may operate under two alternative conditions: When the quantity of steam generated in reactors 147 and 169 is more than the steam condensed in preheaters 146 and 168, the excess steam is discharged through line 203 containing upstream pressure control valve 204. The amount of water leaving the system in the form of steam through line 203 is replaced by charging an equal amount to the system through line 201.

When the quantity of steam generated in reactors 147 and 169 is less than the steam condensed in preheaters 146 and 168, the difference is supplied by adding steam to the system from an outside source through line 205 containing downstream pressure control valve 206. A quantity of water equivalent to the steam entering the system through line 205 and valve 206 is continuously or intermittently withdrawn through line 201 containing valve 202.

The temperature at which reactors 147 and 169 operate depends on the boiling temperature of the water surrounding the catalyst tubes and this boiling temperature is adjusted to the desired point by the pressure maintained on the cooling system by means of either valve 206 or valve 204.

In order to start the operation of the process the water in reactors 147 and 169 must be heated to approximately the boiling temperature. Heating the water may be accomplished by the injection of steam from line 205 through line 207 containing valve 208.

The following example is given to indicate the character of the results obtainable by the use of the process although not with the intent of unduly limiting its scope. The catalyst used in this example was made by precalcining a mixture of phosphoric acid and adsorbents as heretofore described. The phosphoric acid-containing catalyst was then pretreated with 1½ grams of ammonia per pound of catalyst. The phosphoric acid-containing catalyst thus treated was placed in reactor 28. The untreated solid phosphoric acid catalyst was placed in reactors 38 and 48. The charge to the process consisted of a butane-butene fraction having the following composition:

| | Mol per cent |
|---|---|
| i-Butene | 15 |
| n-Butenes | 30 |
| Butanes | 55 |

This charge was passed through solid phosphoric acid catalyst contained in the polymerization reactors at an inlet temperature of 146° C. (295° F.) and a pressure of approximately 650 pounds per square inch. The outlet pressure of the reactors was held at 620 pounds per square inch. As a result of this operation there was produced an amount of iso-octene fraction equal to 25.7% by volume of the B-B fraction charged and 4.5% by volume of higher boiling polymers. The properties of these two products are given below:

| | A. P. I. Gravity | Boiling range |
|---|---|---|
| i-Octenes | 60.5 | 93–126° C. (200–260° F.) |
| Higher boiling polymers | 45.5 | 171–260° C. (340–500° F.) |

The composition of the exit gases from the polymerizing plant released from the receiver of the primary fractionator and produced in an amount of 66.3% of the charge is shown in the table below:

| | mol per cent |
|---|---|
| i-Butene | 1.7 |
| n-Butene | 8.1 |
| Butanes | 90.2 |

The iso-octene fraction was then hydrogenated in two stages by the use of a gas containing approximately 95% hydrogen and 5% of other gases, principally methane. In the primary stage of hydrogenation, the temperature was maintained at 190° C. (374° F.) under a pressure of approximately 60 pounds per square inch, the reaction therefore taking place substantially in vapor phase. In the secondary stage the temperature was again approximately 190° C. (374° F.) but the pressure was approximately 90 pounds per square inch. As a result of this treatment a mixture of iso-octanes was produced in an amount equal to 27 per cent by volume of the B—B fraction charged. These iso-octanes had an A. P. I. gravity of 67 and a uniform octane rating of 98 was obtained throughout the operation. The catalyst employed in the hydrogenating reactors consisted of nickel carbonate deposited upon kieselguhr, reduced in an atmosphere of hydrogen.

The nature of the present invention and its practical aspects are evident from the preceding specification and illustrative data although neither section is intended to be unduly limiting.

I claim as my invention:

1. A process for producing iso-octenes which comprises heating a mixture of normally gaseous hydrocarbons containing butenes, contacting the heated materials in a series of reaction zones with an acidic polymerizing catalyst, passing the gaseous hydrocarbons continuously through a series of reaction zones until the catalyst in the first reaction zone is appreciably reduced in activity, introducing small quantities of a basic nitrogen compound into the second of the series of reaction zones containing the catalyst until the activity of the catalyst in the second zone is reduced, and removing the first reaction zone from the system, and introducing the gaseous hydrocarbons to the second reaction zone.

2. A process for producing iso-octenes which comprises heating a mixture of normally gaseous hydrocarbons consisting principally of butanes and butenes, contacting the heated materials in a series of reaction zones with an acid polymerizing catalyst comprising a phosphoric acid, passing the gaseous hydrocarbons continuously through a series of reaction zones until the catalyst in the first reaction zone is appreciably reduced in activity, introducing small quantities of a basic nitrogen compound into the second of the series of reaction zones containing the phosphoric acid catalyst until the activity of the catalyst in the second zone is reduced, and removing the first reaction zone from the system, and introducing the gaseous hydrocarbons to the second reaction zone.

3. In a process for producing iso-octenes wherein a mixture of normally gaseous hydrocarbons consisting principally of butanes and butenes is contacted in a series of reaction zones with polymerizing catalyst comprising a phosphoric acid, the improvement which comprises pretreating the normally gaseous hydrocarbons consisting principally of butanes and butenes with a water wash to remove the basic ammonia compounds contained in the mixture, passing the said normally gaseous hydrocarbons through reaction zones of an increasing catalytic activity, continuing the operation until the activity in the first reaction zone has been considerably reduced, and pretreating the catalyst in the second reaction zone with an untreated mixture of basic ammonia compounds, butanes and butenes for a period sufficient to reduce the activity of the catalyst in said second reaction zone and removing the first reaction zone from the system, and introducing gaseous hydrocarbons to the second reaction zone.

CLARENCE G. GERHOLD.